(12) United States Patent
Akazawa et al.

(10) Patent No.: US 6,284,408 B1
(45) Date of Patent: Sep. 4, 2001

(54) BATTERY HAVING PROTECTIVE TAPE ON CONNECTING BAND OF ELECTRODE

(75) Inventors: Toshihiro Akazawa, Tokushima; Motoo Tadokoro, Itano-gun; Hiroyuki Tagawa, Itano-gun; Yuji Goto, Itano-gun; Takeshi Yoshida, Itano-gun, all of (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/340,129

(22) Filed: Jun. 28, 1999

(30) Foreign Application Priority Data

Jun. 30, 1998 (JP) .................................................. 10-184939

(51) Int. Cl.[7] ............................. H01M 2/26; H01M 4/80
(52) U.S. Cl. ............................. 429/211; 429/94; 429/237
(58) Field of Search ........................... 429/161, 94, 211, 429/235, 237

(56) References Cited

U.S. PATENT DOCUMENTS

| 4,049,882 | * | 9/1977 | Beatty . |
| 4,794,056 | * | 12/1988 | Pedicini . |
| 5,397,659 | * | 3/1995 | Imhof et al. . |
| 5,518,840 | * | 5/1996 | Verhoog et al. . |
| 5,578,397 | * | 11/1996 | Verhoog et al. . |
| 5,655,295 | * | 8/1997 | Sugikawa . |
| 5,667,915 | * | 9/1997 | Loustau et al. . |
| 5,747,195 | * | 5/1998 | Alamgir et al. . |
| 5,851,599 | * | 12/1998 | Harada et al. . |

FOREIGN PATENT DOCUMENTS

| 2200068 A | * | 7/1988 | (GB) . |
| 61-61230 | | 12/1986 | (JP) . |
| 62-139251 | | 6/1987 | (JP) . |
| 63-4562 | | 1/1988 | (JP) . |
| 2-220365 | | 9/1990 | (JP) . |
| 10-228908 | * | 8/1998 | (JP) . |

* cited by examiner

Primary Examiner—Carol Chaney
Assistant Examiner—Susy Tsang
(74) Attorney, Agent, or Firm—Wenderoth, Lind & Ponack, L.L.P.

(57) ABSTRACT

The battery has an electrode assembly with a first electrode plate and second electrode plate forming a positive electrode plate and negative electrode plate layered via a separator. An external case holds the electrode assembly, and a collector plate is electrically connected to the first electrode plate. The first electrode plate is a non-sintered type electrode with active material loaded into a porous metal material substrate, and has a connecting band of exposed substrate and an active material region. A protective tape is attached to at least one side of the connecting band of the first electrode plate. The connecting band is electrically connected to the collector plate. The second electrode plate projects out beyond the active material border of the connecting band and the active material region, and the active material border is opposite the second electrode plate with the separator in between the first electrode plate and the second electrode plate.

19 Claims, 12 Drawing Sheets

BATTERY HAVING PROTECTIVE TAPE ON CONNECTING BAND OF ELECTRODE

This application is based on application No. 10-184939 filed in Japan on Jun. 30, 1998, the content of which is incorporated hereinto by reference.

BACKGROUND OF THE INVENTION

This invention relates to a battery with a collector plate welded to an electrode assembly and with improved high-rate discharge characteristics.

Figure 1:
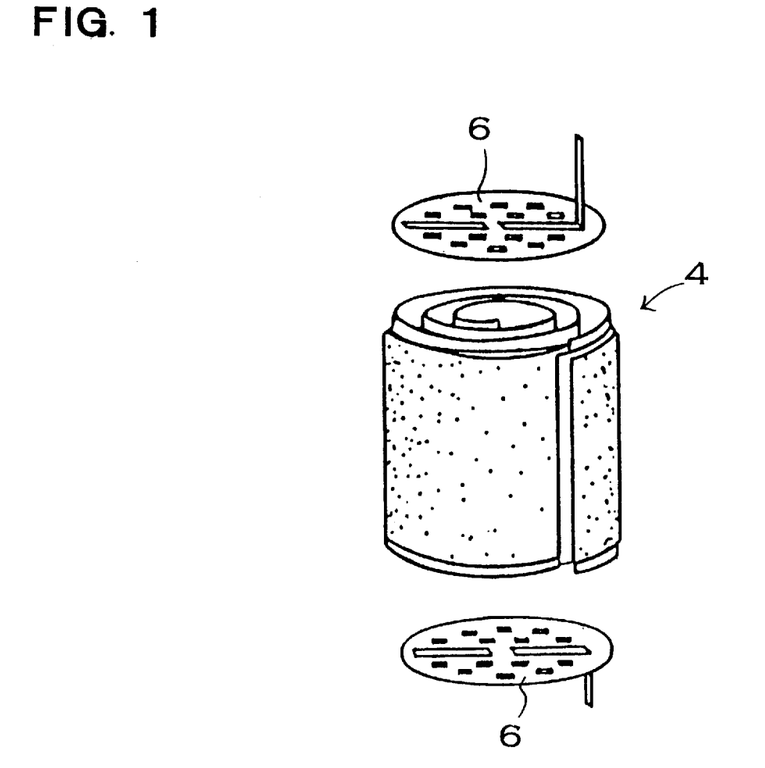
FIG. 1 is an exploded oblique view showing the arrangement for connection of a collector plate to an electrode of an electrode assembly contained within a battery.
Figure 2:
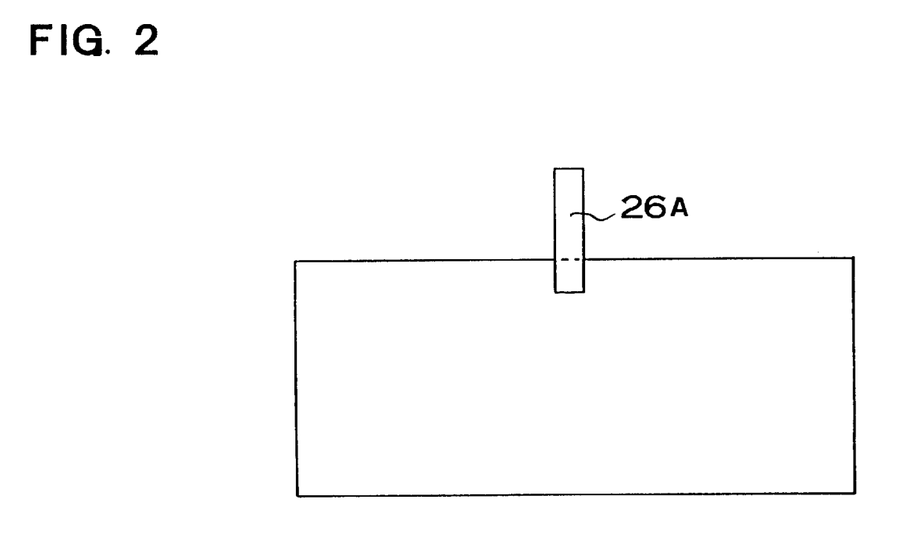
FIG. 2 is a plan view showing an example of a lead plate welded to an electrode plate.

An exploded view of a collector plate connected to an electrode of an electrode assembly is shown in FIG. 1. The battery shown in FIG. 1, containing an electrode assembly 4 and a collector plate 6, has improved high-rate discharge characteristics and is suitable for high current discharge. In the electrode plate shown in the expanded view of FIG. 2, a lead 26A is welded to one part of the electrode. In this type of structure, all electric power collects at, and all current passes through the lead 26A. Therefore, it is difficult to improve high current discharge characteristics for the structure of FIG. 2. In the electrode assembly 4 shown in FIG. 1, an electrode upper edge connects with the collector plate 6 at a plurality of locations, and the distribution of current over the entire electrode is made uniform.

Figure 3:
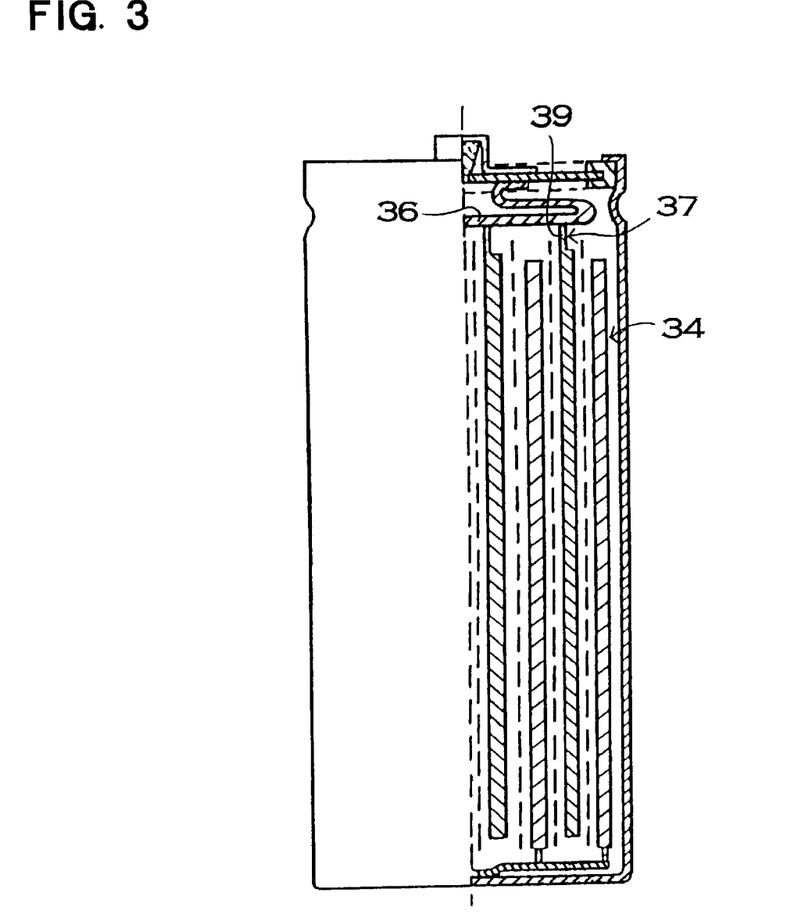
FIG. 3 is a front view partly in cross section of a prior art battery.

The cross-section view of FIG. 3 shows a battery with a collector plate 36 connecting to the upper end of an electrode assembly 34. In a battery with this configuration, the bottom surface of the collector plate 36 connects to one of the electrodes at a plurality of locations. To enable one of the electrode plates to connect to the collector plate 36, one of the electrodes projects out in the upward direction more than the other electrode. The projecting region of the electrode is a connecting band 37, which is a band of the electrode substrate 39 that projects out of the electrode assembly.

Figure 4:
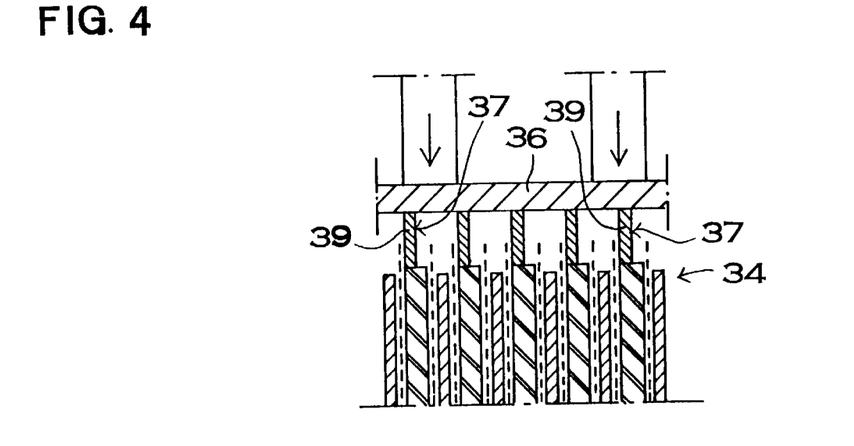
FIG. 4 is an enlarged cross section view showing the collector plate pressing down on, and connecting to the electrode assembly.

As shown in FIG. 4, this type of electrode assembly 34 has the collector plate 36 pressed onto its upper edge, and is connected to the collector plate 36 by resistive electric welding. For connection of the electrode plate to the collector plate 36, one region of the substrate 39 has no active material loaded or has the active material removed from a band which projects out from the electrode assembly 34, and this connecting band 37 connects to the collector plate 36. The substrate 39, which is connected to the collector plate 36, is a porous metallic material such as foamed nickel to insure that active material contacts the most substrate area.

Connection of the porous metal substrate to the collector plate in an ideal fashion is extremely difficult. Technology to accomplish this is cited in the following bulletin disclosures:

(1) Japanese Patent Publication No. 61-61230 issued on Dec. 24, 1986;
(2) Japanese Non-examined Patent Publication No. 62-139251 issued on Jun. 22, 1987;
(3) Japanese Non-examined Patent Publication No. 63-4562 issued on Jan. 9, 1983; and
(4) Japanese Non-examined Patent Publication No. 2-220365 issued on Sep. 3, 1990.

Disclosures (1) and (2) describe structures which compress a region of substrate, such as foamed nickel, which has no active material applied to that region, to form a high density connecting band. This high density connecting band is connected to the collector plate. The battery described in disclosure (1) is provided with a high density connecting band formed by compressing the substrate together in the thickness direction. The battery of disclosure (2) is provided with a high density connecting band formed by compressing the substrate together in the height direction.

Disclosures (3) and (4) describe structures which weld attach a thin metal plate to the connecting band, which is a substrate region with no active material loaded, and this region is connected to the collector plate.

However, even with the technology described in the above disclosures, the connecting band of the substrate cannot be connected to the collector plate in an ideal fashion. In particular, to reliably connect the connecting band to the collector plate at a plurality of locations, the collector plate must be pressed onto the connecting band with considerable pressure, and attached by resistive electric welding. If the collector plate is pressed onto the connecting band with less pressure, electric resistance at connecting points between the collector plate and the connecting band becomes large, and resistive electric welding cannot be performed properly. The welding apparatus supplies a constant current to perform a weld. If the collector plate and connecting band are welded by resistive electric welding in a high resistance state, the welding apparatus must apply a high voltage between the collector plate and connecting band. If high voltage is applied, an arc discharge can occur between the collector plate and connecting band. This results in a sudden reduction in resistance, supply of high electric power to the weld region, and instantaneous melting and flying off of material at the contacting region. Proper connection of the collector plate and connecting band can in no way be accomplished with this "blast-away" condition.

Figure 5:
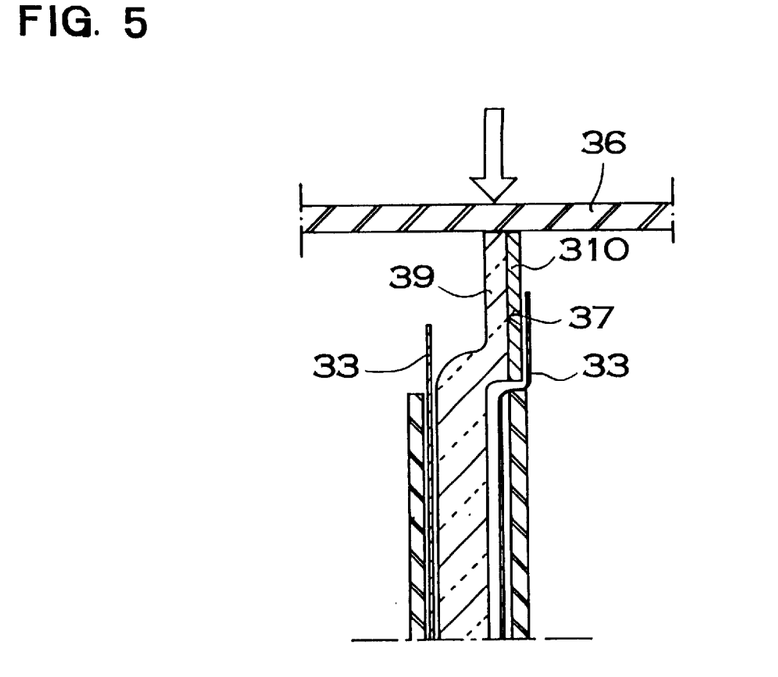
FIG. 5 is an enlarged cross section view showing an example of connecting band bending at the active material border which can generate an internal short circuit.
Figure 6:
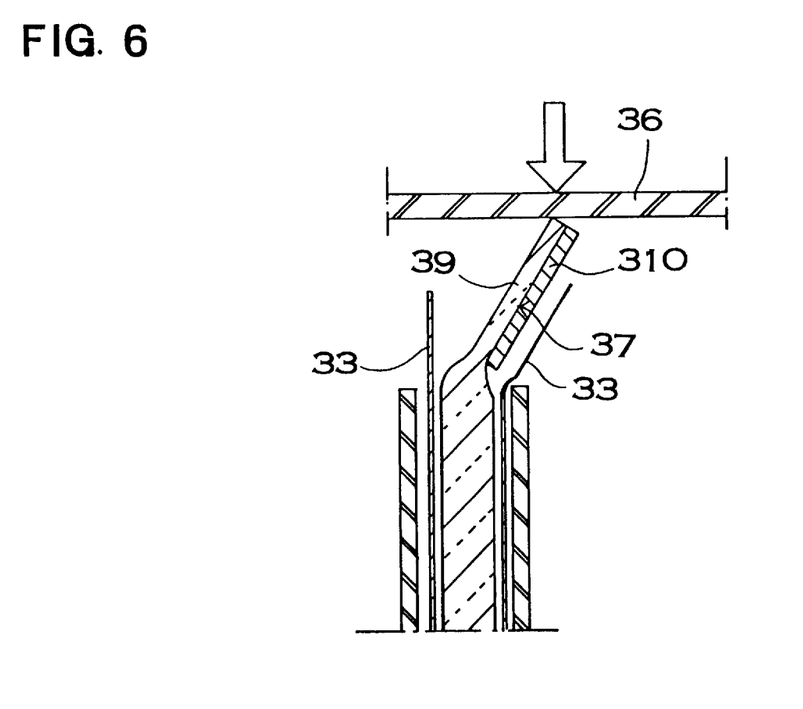
FIG. 6 is an enlarged cross section view showing another example of connecting band bending at the active material border which can generate an internal short circuit.

To avoid this problem, the collector plate can be pressed strongly against the connecting band and welded. When this is done, the connecting band 37 bends as shown in FIGS. 5 and 6, and becomes the cause of internal short circuits. This is because the bent part breaks through the separator 33 and comes in contact with the other electrode. In particular, the discontinuous part of the connecting band 37 is weak, and the region at the border of active material loaded is easily bent. This problem cannot be eliminated either by welding a laminate thin metal plate to the connecting band 37 or by compressing the substrate to form a high density region. This is because the substrate has a discontinuous border region. In particular, a non-sintered type electrode of active material loaded into a porous metal substrate 39 is mechanically weak and is easily damaged when strongly pressed.

Further, in a battery with the collector plate welded to the connecting band at a plurality of locations, all connecting points cannot be pressed together for welding with the same pressure. For a collector plate provided with a plurality of holes with hole edges projecting downward, the projecting edges are put in contact with the connecting band for electric welding. However, considerable pressure is required against the connecting band to insure proper welding of all connecting points. Consequently, the connecting band is pressed strongly at some locations which are easily bent, and it has the disadvantage that this can easily cause internal short circuits. This disadvantage is the same for a collector plate with a flat bottom surface as well.

This invention was developed to eliminate these type of disadvantages. A primary object of the present invention is to provide a battery that connects the collector plate and the connecting band in the closest to ideal manner.

SUMMARY OF THE INVENTION

The battery of the present invention is provided with an electrode assembly which is a laminate of a positive first electrode plate and a negative second electrode plate with a separator between them, an external case to hold this electrode assembly, and a collector plate which is electrically connected to the first electrode plate and electrically connects the first electrode plate to one terminal of the battery. The battery of the present invention preferably has the first electrode plate as the positive electrode plate and the second electrode plate as the negative electrode plate. However, it is needless to say that the first electrode plate may be the negative electrode plate and the second electrode plate may be the positive electrode plate.

The first electrode plate is a non-sintered type electrode, and is a substrate of porous metal material with active material loaded into it to form an active material portion. The first electrode plate has an area with active material loaded into it and a connecting band with bare substrate exposed. This connecting band is welded at a plurality of locations on the collector plate to connect it to the collector plate.

Further, in the battery of the present invention, the second electrode plate projects out beyond the active material border between the connecting band and the active material portion (i.e., area or region with active material) of the first electrode. The active material border of the first electrode plate is disposed opposite the second electrode plate with a separator between them. This structure, with the active material border of the first electrode plate opposite the second electrode plate, if described differently, is a structure which sandwiches and retains the active material border of the first electrode plate with the second electrode plate. The first electrode plate active material border sandwiched and held between the second electrode plate is difficult to bend even when pressed by the collector plate. Consequently, when the collector plate is pressed strongly onto the connecting band and welded, bending of the first electrode plate at the active area border, breaking through the separator, and internal shorting is reliably prevented.

Due to the structure described above, the present invention has the feature that a near ideal battery configuration with excellent high rate discharge characteristics can be fabricated. In particular, the collector plate can be strongly pressed onto the electrode assembly connecting band, and the collector plate and the connecting band can be reliably welded together. In addition, the battery has the feature that internal short circuits between the first electrode plate and the second electrode plate can be drastically reduced. This is because the second electrode plate, which is opposite the first electrode plate with the separator in between, projects out beyond the active material border between the connecting band and the active material area of the first electrode plate. In a battery with the second electrode plate projecting beyond the active material border of the first electrode plate, the active material border of the first electrode plate is supported by the second electrode plate. As a result, when the first electrode plate connecting band is pressed upon and welded, bending at the active material border and internal short circuits are effectively prevented.

DETAILED DESCRIPTION OF THE INVENTION

Figure 7:
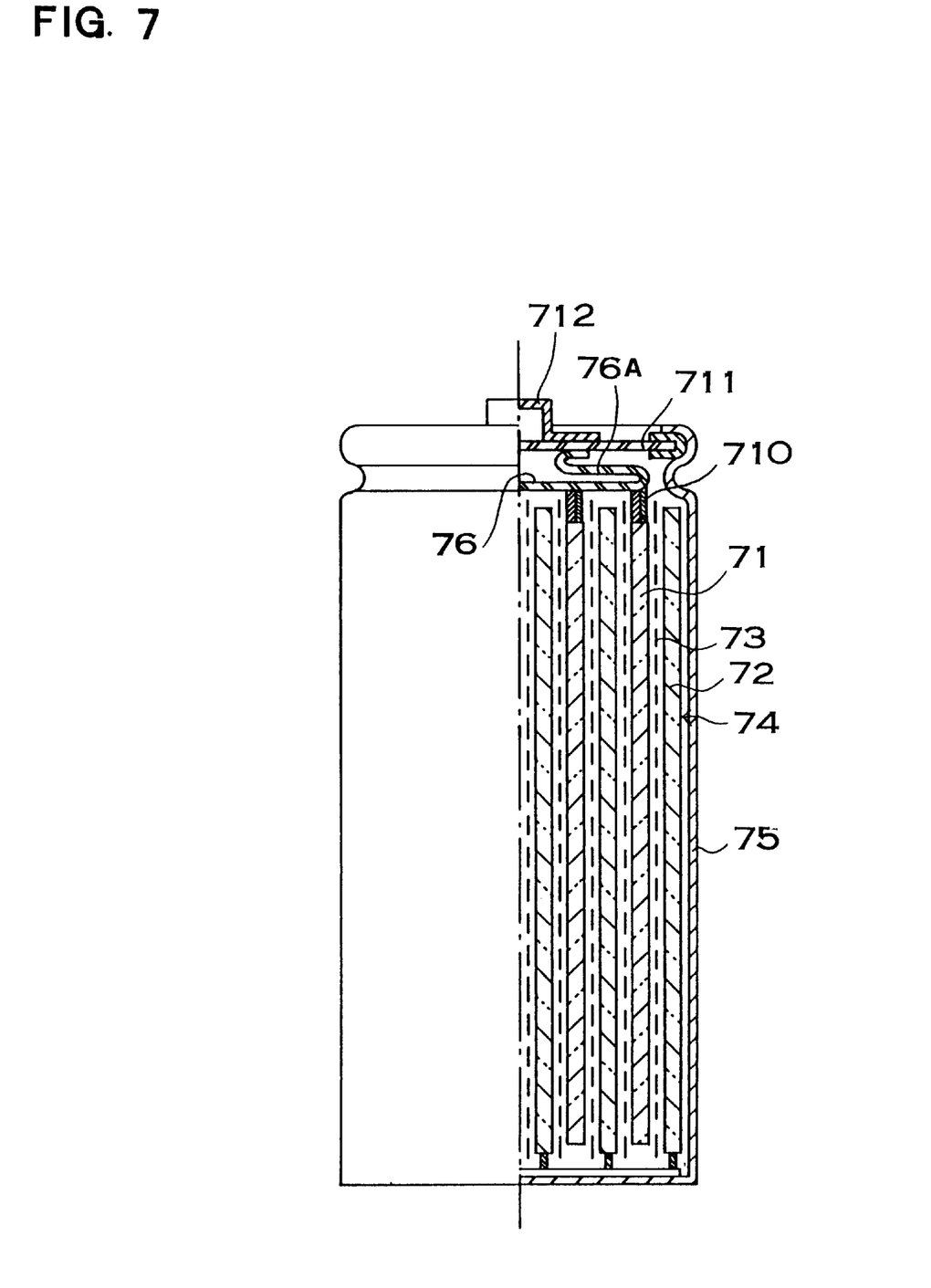
FIG. 7 is a front view partly in cross section of an embodiment of the battery of the present invention.

Turning to FIG. 7, the battery shown is provided with a circular cylindrical shaped external case 75 sealed in an airtight fashion by a sealing lid 711, an electrode assembly 74 inserted within the external case 75, and a collector plate 76 which connects the electrode assembly 74 via the sealing lid 711 to a terminal 712. Although the battery shown in FIG. 7 has a circular cylindrical shaped external case 75, the present invention does not specify the external case as a circular cylinder. Although not illustrated, the external case may, for example, take on the shape of a square cylinder or an elliptical cylinder.

The external case 75 is made of iron or steel with nickel plated surfaces. The material for the external case 75 is the optimum metal selected considering the type of battery and its characteristics. For example, the external case 75 may also be made of stainless steel, aluminum, or aluminum alloy. The open region at the upper end of the metal external case 75 is sealed closed in an airtight fashion by the sealing lid 711. The sealing lid 711 is fixed in place for an airtight seal with the external case 75 by a caulked junction structure or by a method such as laser welding the border between the sealing lid 711 and the external case 75. The sealing lid 711 fixes one terminal 712 of the battery in place. This terminal 712 is fixed in place so as to be electrically insulated from the external case 75.

The battery of the present invention is of a type containing non-sintered electrodes such as a nickel hydride battery. However, the present invention is not restricted to a battery which is nickel hydride. For example, the battery may also be a nickel cadmium battery or a lithium ion battery, etc. In the following, an example of a nickel hydride battery is described in detail as a preferred embodiment.

The electrode assembly 74 is a first electrode plate 71 and second electrode plate 72 wound together with a separator 73 in between. The battery shown in FIG. 7 has the first electrode plate 71, which connects to the collector plate 76, as its positive electrode plate, and the second electrode plate 72 as the negative electrode plate. However, the first electrode plate may be the negative electrode plate and the second electrode plate may be the positive electrode plate. A laminate of the first electrode plate 71, the second electrode plate 72, and the separator 73 in between, is wound into a spiral shape to form the electrode assembly 74. The spiral shaped electrode assembly 74 is inserted into the circular cylindrical external case 75. The spiral electrode assembly may also be pressed from both sides to distort it into an elliptical shape for insertion into an elliptical shaped external case. Further, an electrode assembly for insertion into a square cylindrical external case is fabricated by cutting a plurality of first electrode plate and second electrode plate sheets, and stacking them with a separator in between.

Polyethylene non-woven fabric is used as the separator. However, a micro-porous membrane made of a synthetic resin, such as polyethylene, may also be used as the separator 73. Any sheet-like material which can electrically insulate the first electrode plate 71 and the second electrode plate 72 on either side, and also allow electrolytic solution to permeate through it can be used as the separator 73.

The first electrode plate 71 is a non-sintered type electrode plate of a porous metal material substrate with active material loaded into it. Metal material with three dimensional porosity, such as foamed nickel porous material or nickel fiber porous material, etc. is used as the porous metal substrate. The first electrode plate 71 is a substrate such as this with active material loaded into it.

Figure 8:
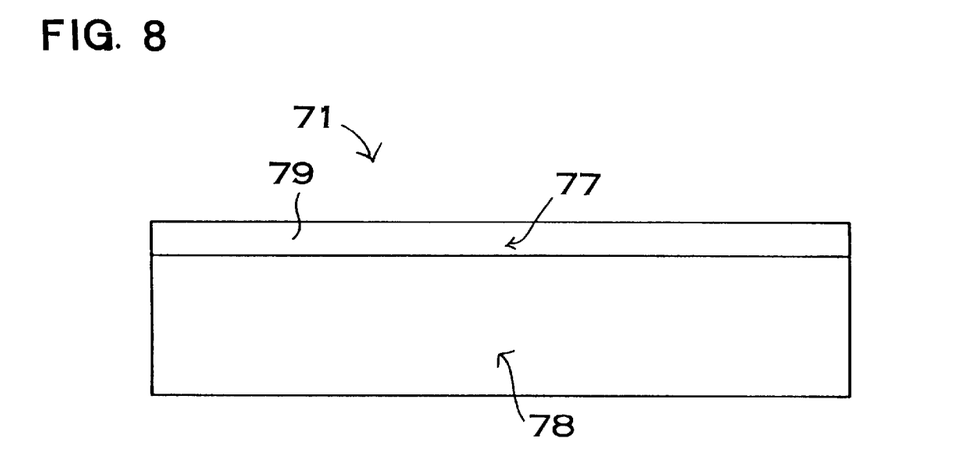
FIG. 8 is an expanded view of the first electrode plate of the battery shown in FIG. 7.

As shown in the expanded view of FIG. 8, the upper part of the substrate 79 of the first electrode plate 71 is provided with a connecting band 77, while active material is loaded into the other part forming an active material portion or region 78. Active material is not loaded into the connecting band 77, or the loaded active material is removed to expose the substrate 79. As shown in the cross section view of FIG. 9, a thin metal plate 710 such as nickel ribbon, etc. if fixed to the connecting band 77 to insure a more reliable electrical connection to the collector plate. The thin metal plate 710 is attached in an electrically conducting fashion to the connecting band 77 by welding or with conductive adhesive.

A battery with a thin metal plate, or a thin metal plate with openings such as a punched metal plate, attached to the connecting band of the first electrode plate, in addition to having the second electrode plate projecting out beyond the active material application border of the first electrode plate, has the superior characteristic that internal short circuits can be more effectively prevented. This is because when the first electrode plate and the second electrode plate are wound into a spiral shape with the separator between them, the first electrode plate connecting band and the thin metal plate are wound into a spiral shape as a single unit. When the collector plate is pressed down for connection to the first electrode plate, the thin metal plate effectively prevents bending of the electrode substrate. Further, if material with holes or openings such as punched metal, etc. is used as the thin metal plate, sufficient flexibility is attained, thin metal plate fracture does not occur even when the electrode assembly is wound into a spiral shape, and internal short circuits are prevented with extreme effectiveness.

Figure 10:
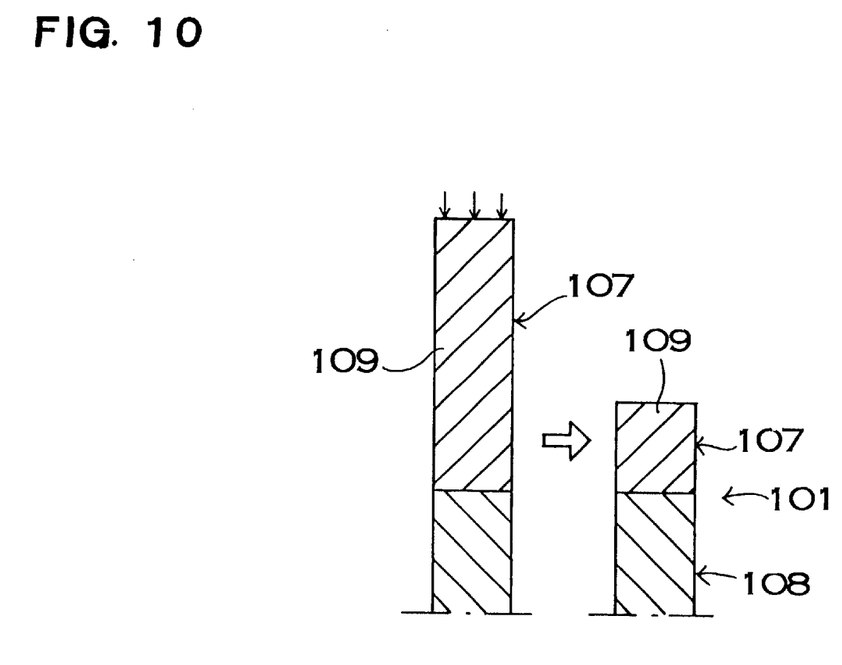
FIG. 10 is a cross section view showing another example of the connecting band of the first electrode plate.
Figure 11:
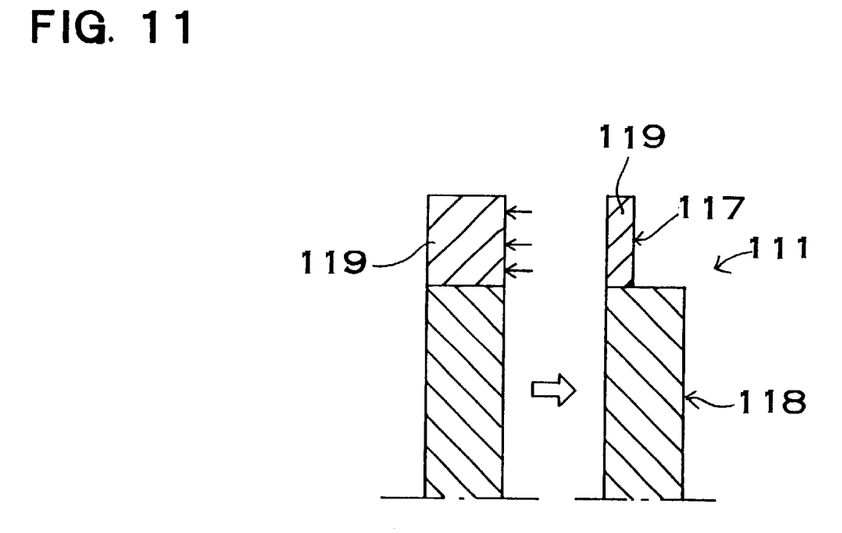
FIG. 11 is a cross section view showing still another example of the connecting band of the first electrode plate.

The connecting band does not necessarily have a thin metal plate attached to it. For example, as shown in FIGS. 10 and 11, exposed substrates 109, 119 can be pressed at the connecting bands 107, 117 to compress the substrates to a high density for connection to the collector plates. The connecting band 107 shown in FIG. 10 is formed by compressing exposed substrate 109 in the vertical direction to a high density. The connecting band 117 shown in FIG. 11 is formed by compressing exposed substrate 119 in the horizontal direction to a thin band with high density. The porous metal substrates 109, 119 compressed to a high density are directly connected to the collector plates without using thin metal plates. In these figures, 101, 111 are the first electrode plates and 108, 118 are the active material regions of the electrode plates.

As shown in the cross section view of FIG. 9, the upper end of the connecting band 77 extends out beyond the second electrode plate 72, and the border of the active material region 78 of the first electrode plate 71 is positioned below the upper end of the second electrode plate 72. In other words, the upper end of the second electrode plate 72 extends beyond the border of the active material region 78 of the first electrode plate 71, and the border of the active material region 78 is positioned in opposition to the second electrode plate 72 with the separator in between. The amount of overlap of the upper edge of the second electrode plate 72 over the active material region 78 border is set, for example, at approximately 0.8 mm. If the amount of overlap is increased, the second electrode plate 72 sufficiently sandwiches and supports the first electrode plate 71 connecting band 72, but the width of the first electrode plate 71 active material region 78 decreases reducing the capacity of the battery. Conversely, if the amount of overlap is reduced, the first electrode plate 71 connecting band 77 cannot be sufficiently supported by the second electrode plate 72. Therefore, the amount of overlap is set to an optimum value, for example, in the range from 0.3 mm to 1.5 mm, and preferably between 0.5 mm and 1 mm, considering the efficacy of second electrode plate 72 support and battery capacity.

Figure 9:
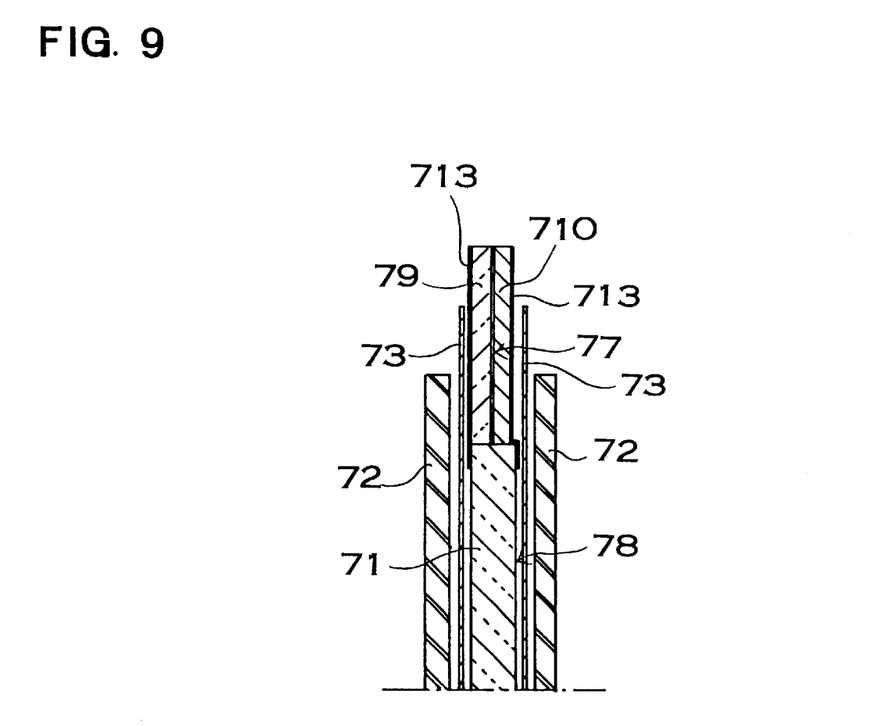
FIG. 9 is an enlarged cross section view showing the laminate structure of the electrode assembly of the battery shown in FIG. 7.

The first electrode plate 71 of the FIG. 9 has protective tape 713 attached to both sides of the connecting band 77. The lower end of the protective tape 713 extends below the border of the active material. In other words, an end of the protective tape which is opposite to the end of the protective tape which is closest to the first end of the electrode assembly extends past the border toward the second end of the electrode assembly. This is to prevent bending at the border of the active material and breaking through the separator 73 when the collector plate is pressed onto and welded to the connecting band 77. A battery with protective tape 713 attached has the characteristic that internal short circuits are prevented and the collector plate can be reliably connected to the connecting band 77. In particular, the configuration shown in FIG., 9 with protective tape 713 attached to both side of the connecting band 77 has the characteristic that internal short circuits can be most effectively prevented. Protective tape can also be attached to one side of the connecting band. Protective tape attached to only one side of the connecting band is attached to either the side with the thin metal plate welded on, or to the side with no thin metal plate welded on. However, the battery of the present invention may also connect the connecting band to the collector plate without using any protective tape.

Figure 12:
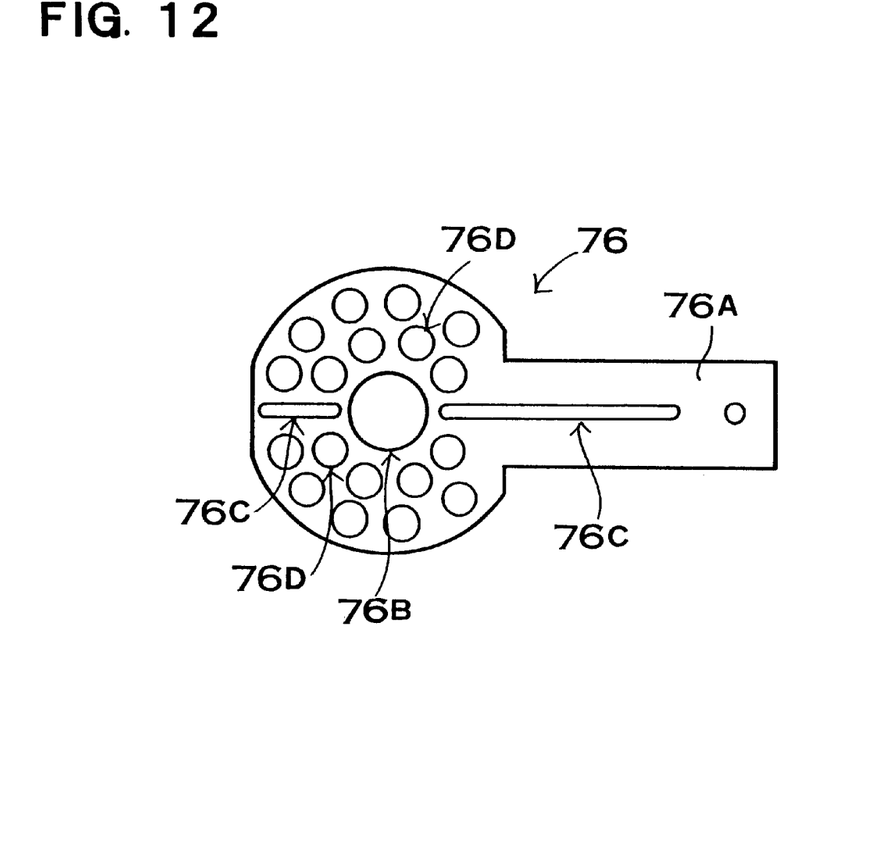
FIG. 12 is an expanded view of the collector plate of the battery shown in FIG. 7.
Figure 13:
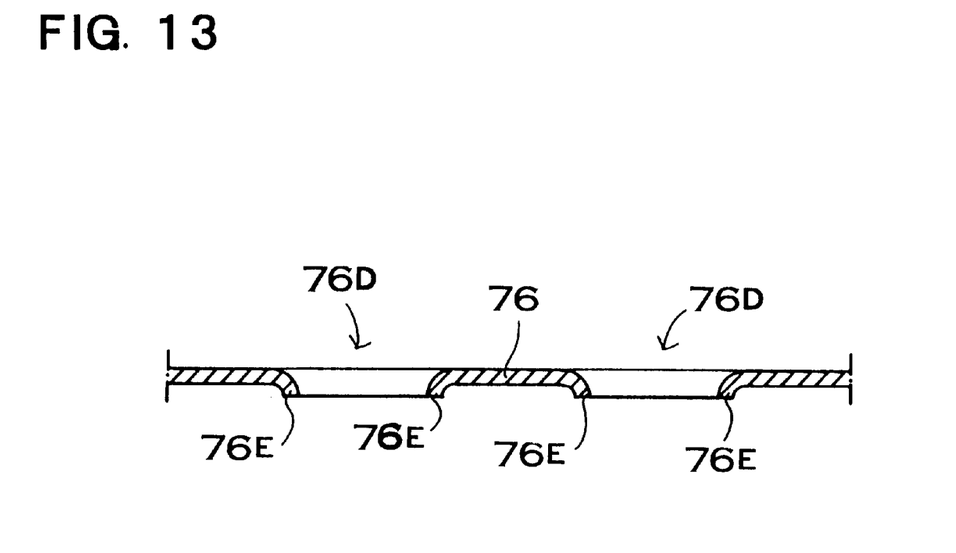
FIG. 13 is an enlarged cross section view of the collector plate shown in FIG. 12.

As shown in FIGS. 7 and 12, the collector plate 76 is a disk shaped metal plate smaller than the inside diameter of the external case 75 with a lead plate 76A projecting from it. The collector plate 76 is provided with slits 76C on both sides of a center hole 76B to reduce unnecessary electric current during resistive electric welding. Further, a plurality of holes 76D are also opened through the collector plate 76. As shown in the enlarged cross section view of FIG. 13, projections 76E are provided extending downward from the periphery of the holes 76D, and these projections 76E connect with the first electrode plate 71 connecting band 77. The lead plate 76A of the collector plate 76 is connected to the terminal 712, which is attached to the upper end of the external case 75 in an electrically insulated fashion.

[First Embodiment]

An electrode assembly for insertion into the external case of a nickel hydride battery is fabricated by the following process.

Fabrication of the Positive First Electrode Plate (1) Porous metal material is formed by the following process.

Organic porous material in sponge form, which is open-cell polyurethane, is metal plated by immersion in an electrolyte tub of plating solution after conductive processing. The metal plated organic porous material is then baked at a temperature of 750° C. for a prescribed length of time to remove the resin component of the organic porous material. Finally, porous metal material is finished after sintering in a reducing atmosphere. The porous metal material formed by this process is foamed nickel with a target density of approximately 600 g/m$^2$, porosity of 95%, and thickness of approximately 2.0 mm.

(2) The following materials are mixed together to make the positive electrode active material slurry.

| | |
|---|---|
| nickel hydroxide powder (2.5 wt. % zinc and 1 wt. % cobalt are included as co-precipitate components) | 90 parts by weight |
| cobalt powder | 10 parts by weight |
| zinc oxide powder | 3 parts by weight |
| 0.2 wt. % aqueous solution of hydroxypropyl-cellulose | 50 parts by weight |

(3) The prepared positive electrode active material slurry mixture is loaded into vacancies in the porous metal material. The amount of material applied is adjusted to give an active material density of approximately 2.19 g/cc—void after roll-pressing.

After active material loading, the electrode is dried, roll-pressed to a thickness of approximately 0.7 mm, and cut into strips. Next, active material is eliminated from one of the long edges of a strip by a method such as ultrasonic removal, etc. to produce a first electrode plate 71 with an exposed substrate 79 connecting band 77 as shown in FIG. 8.

Figure 14:
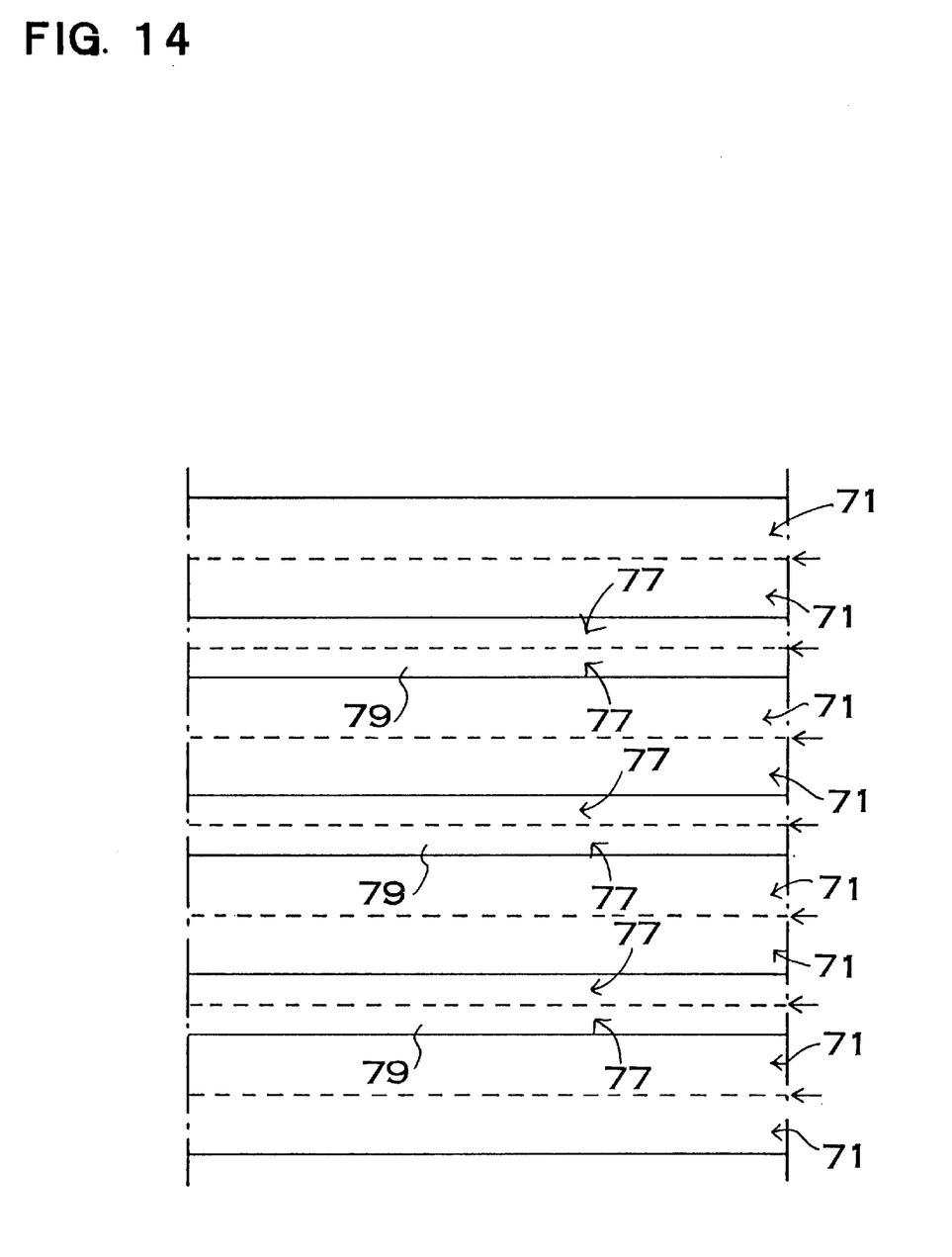
FIG. 14 is a plan view showing an example of a method of fabricating the first electrode plate.

The first electrode plate may also be formed with active material loaded by the following process. As shown in FIG. 14, parallel prescribed widths of porous metal material are roll-pressed prior to active material application. The roll-pressed width is twice the width of the connecting band 77 or approximately 5 mm, and the thickness after roll-pressing is approximately 0.5 mm. The active material slurry described above is loaded into the locally roll-pressed porous metal material substrate 79. Next, the electrode material is roll-pressed, followed by cutting along the locations indicated by the arrows of FIG. 14 to fabricate strips of first electrode plates 71.

Finally, active material is removed from the region which is roll-pressed thin to form the connecting band 77 by spraying compressed air or using a brush, etc. to expose the substrate 79.

(4) A thin metal plate 710 is connected to the exposed substrate 79 connecting band 77 by resistive electric welding. Nickel ribbon with a thickness of 0.1 mm and width of 3 mm is used as the thin metal plate 710.

Fabrication of the Negative Second Electrode Plate (1) A hydrogen occluding alloy is fabricated and pulverized by the following process.

Misch metal (a mixture of La, Ce, Nd, Pr, etc. rare-earth elements), nickel, cobalt, aluminum, and magnesium, are measured and mixed in a 1.0:3.4:0.8:0.2:0.6 ratio by atomic weight. The mixture is put in a crucible, dissolved in a high frequency melting furnace, and cooled to form a hydrogen absorbing alloy electrode with the following composite equation.

$$Mm_{1.0}Ni_{3.4}Co_{0.8}Al_{0.2}Mn_{0.6}$$

Next, the ingot of hydrogen absorbing alloy obtained in this manner is roughly pulverized, and subsequently crushed to a powder in an inert gas ambient to an average particle diameter of 60 μm.

(2) Slurry of hydrogen absorbing alloy is formed as follows.

Polyethylene oxide powder is added as a binder, and an ion-exchange water is also added to the hydrogen absorbing alloy powder. The components are mixed to form slurry. The amount of polyethylene oxide powder binder added is 1.0 wt.% of the hydrogen absorbing alloy (3) Slurry is applied to both sides of a punched metal substrate. The amount of slurry coated is adjusted to give an active material density of 5 g/cc after roll-pressing. Next, drying and roll-pressing is performed followed by cutting to a prescribed size to form the negative second electrode plate. Slurry is coated avoiding application to the bottom edge of the punched metal substrate to form a connecting band. The connecting band may also be provided by coating slurry to the entire area of the punched metal substrate, then removing active material at the bottom edge after drying.

The first electrode plate 71 and second electrode plate 72 fabricated by the process steps described above are wound together with a polyethylene non-woven fabric separator 73 between the electrodes to form a spiral shaped electrode assembly 74. The first electrode plate 71 and second electrode plate 72 are wound together in the relative positions shown in FIG. 15.

Figure 15:
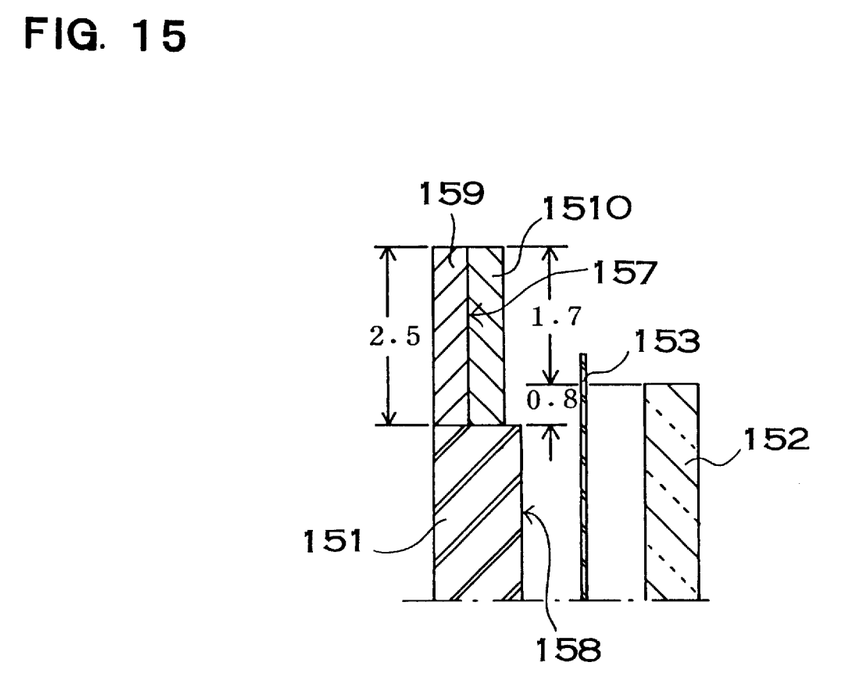
FIG. 15 is a cross section view showing the relative position of the first electrode plate and the second electrode plate of the first embodiment of the battery of the present invention.

Disk shaped collector plates are connected to the top and bottom (first end and second end) of the electrode assembly by resistive electric welding. One hundred electrode assemblies were fabricated by the above process, and the number of internal short circuits by contact between the first electrode plate 151 and the second electrode plate 152 were counted. One electrode assembly had an internal short circuit, and ninety nine had no internal short circuits. The shorted region was the active material border between the connecting band 157 and the active material region 158. At that location, the first electrode plate 151 foamed nickel frame projected out piercing through the separator 153 to contact the second electrode plate 152. In FIG. 15, 159 is the substrate and 1510 designates the thin metal plate.

[Second Embodiment]

Figure 16:
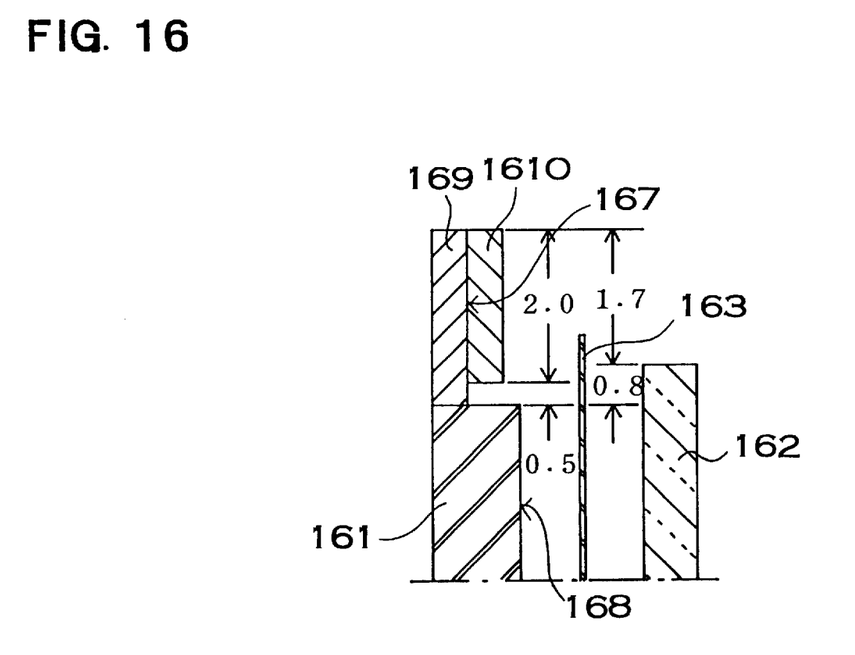
FIG. 16 is a cross section view showing the relative position of the first electrode plate and the second electrode plate of the second embodiment of the battery of the present invention.

As shown in FIG. 16, besides making the thin metal plate 1610 narrower to form a 0.5 mm gap between the thin metal plate 1610 and the active material border, the relative positions of the first electrode plate 161 and the second electrode plate 162 are the same as the first embodiment. In FIG. 16, 163 designates the separator, 167 is the connecting band, 168 is the active material region, and 169 is the substrate. Again one hundred electrode assemblies were fabricated with collector plates connected. Counting the number of electrode assemblies with internal short circuits resulted in one shorted electrode assembly and no short circuits in the remaining ninety nine. The shorted region was the same as for the first embodiment.

[Third Embodiment]

Figure 17:
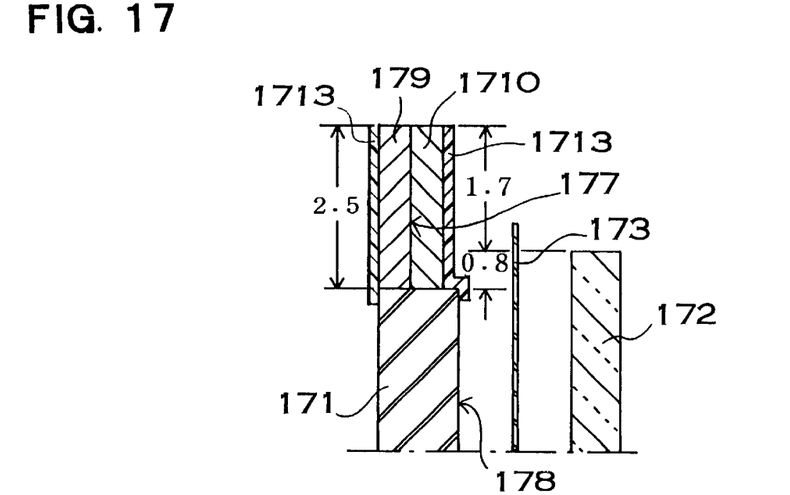
FIG. 17 is a cross section view showing the relative position of the first electrode plate and the second electrode plate of the third embodiment of the battery of the present invention.

As shown in FIG. 17, besides attaching protective tape 1713 to the connecting band 177, the first electrode plate 171 and the second electrode plate 172 are the same as the first embodiment. In FIG. 17, 173 designates the separator, 178 is the active material region, and 179 is the substrate. Polypropylene heat bonded tape 200 μm thick is used as the protective tape 1713. Again one hundred electrode assemblies were fabricated. Counting the number of electrode assemblies with internal short circuits resulted in none. Effective suppression of internal short circuits due to outward projection of the substrate frame at the active material border was demonstrated.

[Fourth Embodiment]

Figure 18:
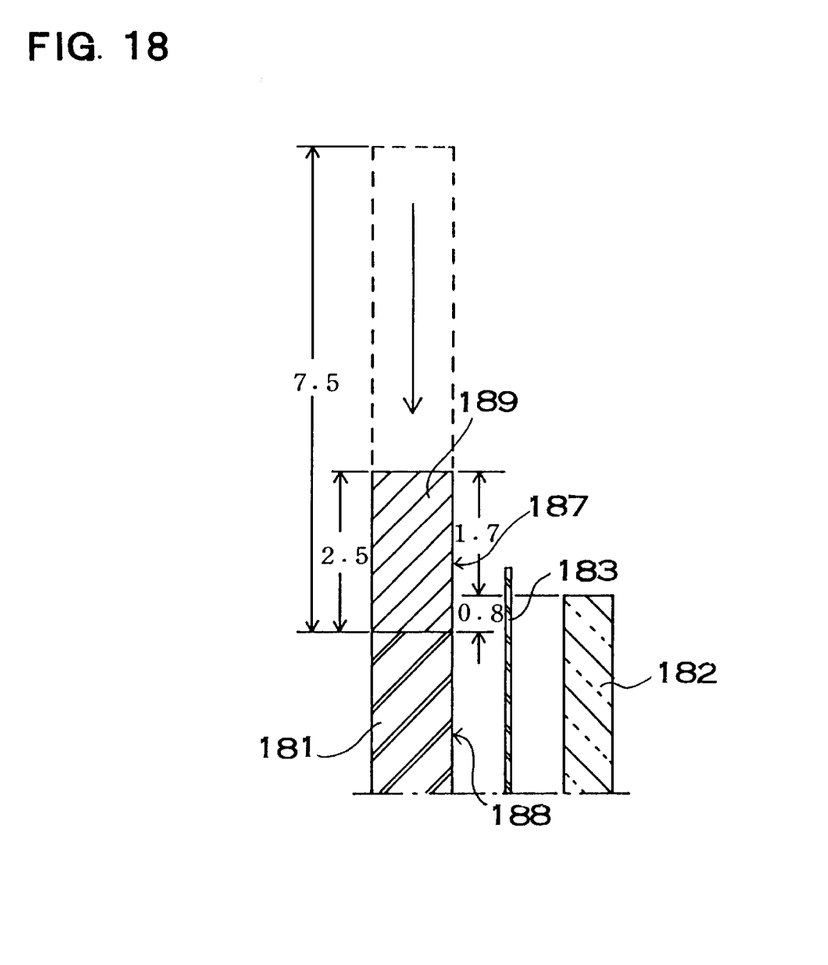
FIG. 18 is a cross section view showing the relative position of the first electrode plate and the second electrode plate of the fourth embodiment of the battery of the present invention.

As shown in FIG. 18, besides pressing the first electrode plate 181 substrate 189 to compress the connecting band 187 to one third its height, and not attaching a thin metal plate to the exposed substrate 189 at the connecting band 187, this embodiment is the same as the first embodiment. FIG. 18 shows the substrate before compression with broken lines. Further, in FIG. 18, 182 designates the second electrode plate, 183 is the separator, and 188 is the active material region. Again one hundred electrode assemblies were fabricated by this process. Counting the number of electrode assemblies with internal short circuits resulted in one shorted electrode assembly and no short circuits in the remaining ninety nine. The shorted region was the same as for the first embodiment.

[Fifth Embodiment]

Figure 19:
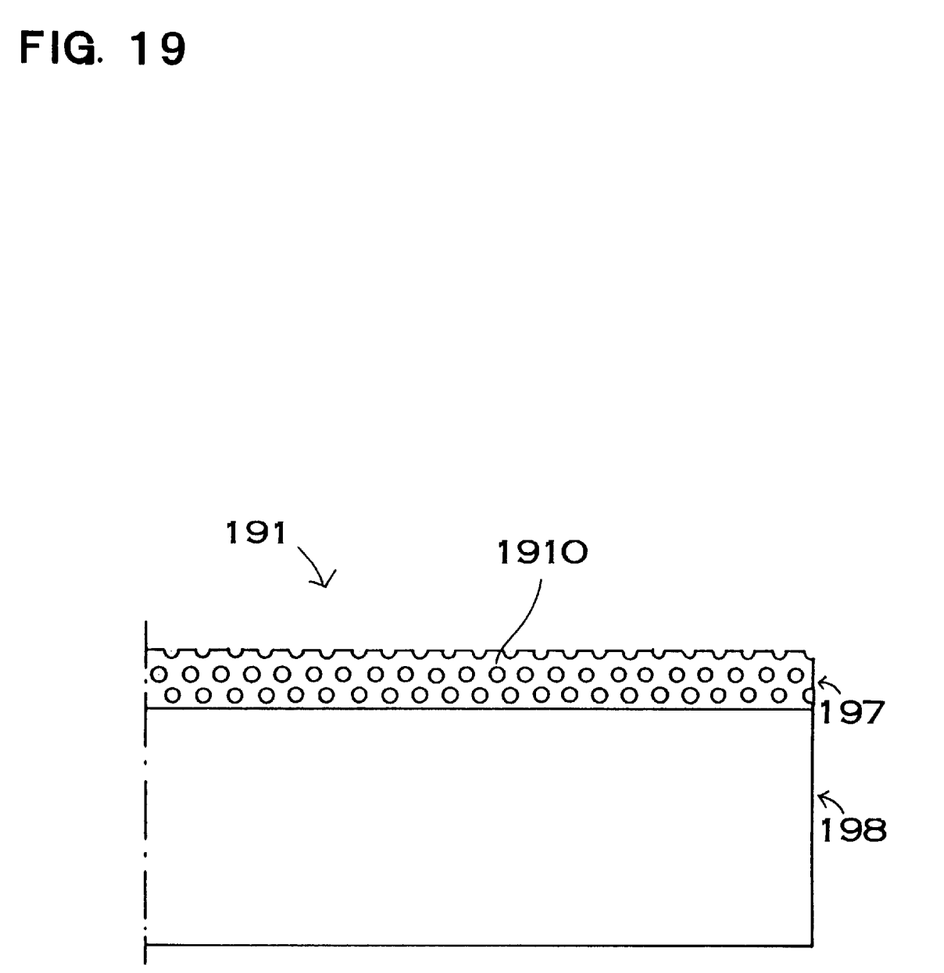
FIG. 19 is a plan view showing the first electrode plate of the fifth embodiment of the battery of the present invention.

As shown in FIG. 19, besides resistive electric welding of punched metal, which forms a perforated thin metal plate 1910, to the exposed substrate connecting band 197 of the first electrode plate 191, this embodiment is the same as the first embodiment. In FIG. 19, 198 is the active material region. Again one hundred electrode assemblies were fabricated with collector plates connected. Counting the number of electrode assemblies fabricated by this process with internal short circuits resulted in none. In this embodiment, punched metal was welded to the connecting band 197 as the perforated thin metal plate 1910. However, expanded metal may also be used in place of punched metal as the perforated thin metal plate.

First Comparison Example

Figure 20:
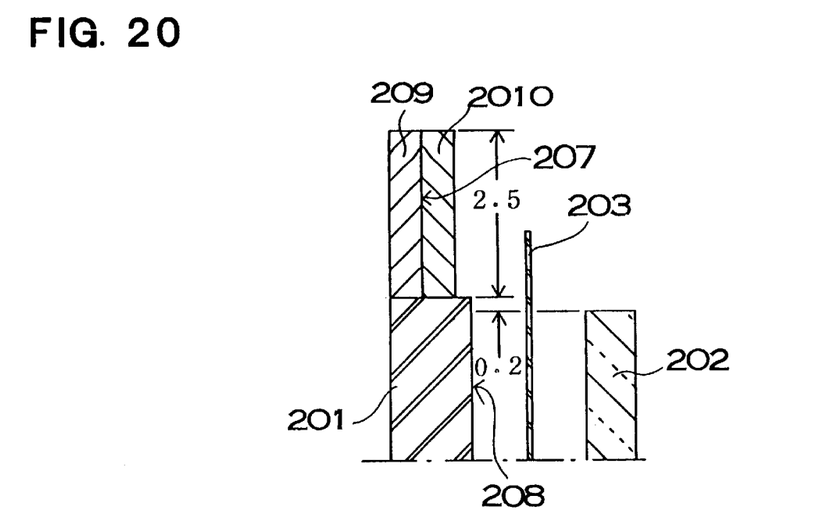
FIG. 20 is a cross section view showing the relative position of the first electrode plate and the second electrode plate of the battery of the first comparison example.

As shown in FIG. 20, the active material border of the first electrode plate 201 substrate 209 is 0.2 mm higher than the top of the second electrode plate 202. In other words, the upper edge of the second electrode plate 202 is 0.2 mm below the first electrode plate 201 active material border. Otherwise, this embodiment is the same as the first embodiment. In FIG. 20, 203 designates the separator, 207 is the connecting band, 208 is the active material region, and 2010 is the thin metal plate. Again one hundred electrode assemblies were fabricated with collector plates connected. Counting the number of electrode assemblies with internal short circuits resulted in twenty five shorted electrode assemblies. The shorted region for the majority of electrode assemblies was contact between the connecting band and the second electrode plate as shown in FIGS. 5 or 6.

Second Comparison Example

Figure 21:
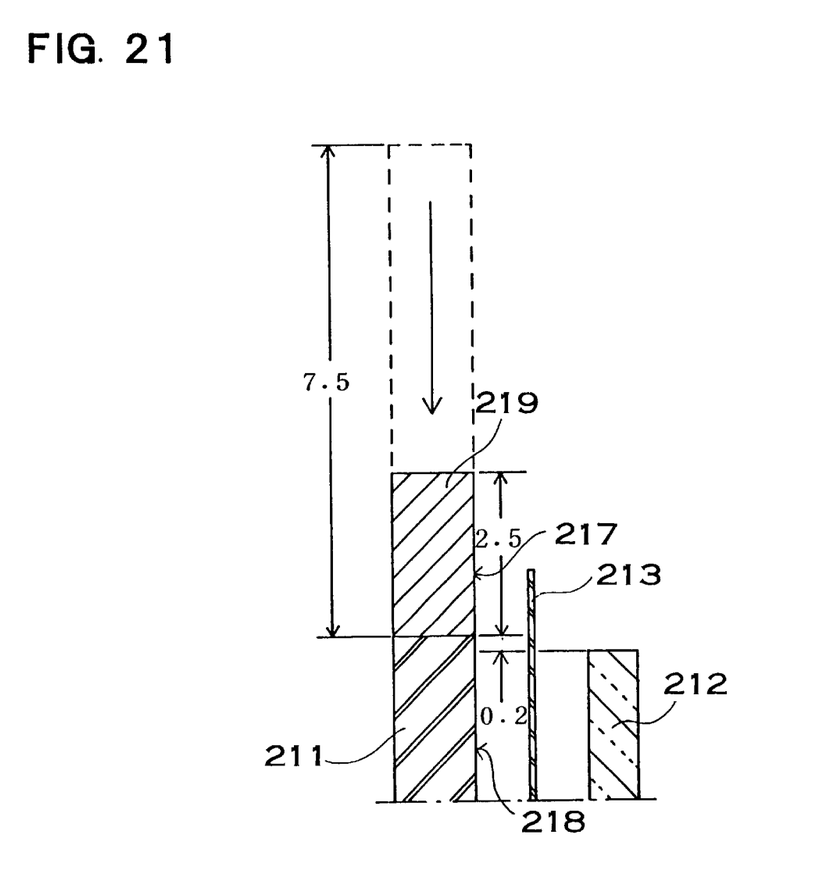
FIG. 21 is a cross section view showing the relative position of the first electrode plate and the second electrode plate of the battery of the second comparison example.

As shown in FIG. 21, besides pressing the first electrode plate 211 substrate 219 to compress the connecting band 217 to one third its height, not attaching a thin metal plate to the connecting band 217, and positioning the upper edge of the second electrode plate 212 is 0.2 mm below the first electrode plate 211 active material border, this embodiment is the same as the first embodiment. FIG. 21 shows the substrate before compression with broken lines. Further, in FIG. 21, 213 designates the separator and 218 is the active material region. Again one hundred electrode assemblies were fabricated with collector plates connected. Counting the number of electrode assemblies with internal short circuits resulted in thirty one. The mechanism for internal shorting was the same as for the first comparison example.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A battery comprising:
   an external case;
   an electrode assembly held in said external case and having a first end and a second end, said electrode assembly including:
   a first electrode plate having an active material portion comprised of active material loaded into a porous metal substrate, having a connecting band of exposed substrate at said first end of said electrode assembly, and having an active material border at a boundary between said connecting band and said active material portion;
   a separator;
   a second electrode plate layered with said first electrode plate via said separator such that an end of said second electrode plate projects beyond said active material border of said first electrode plate toward said first end of said electrode assembly; and
   protective tape attached to at least one side of said connecting band of said first electrode plate such that an end of said protective tape opposite said first end of said electrode assembly extends past said active material border toward said second end of said electrode assembly; and
   a collector plate welded at a plurality of locations to said connecting band of said first electrode plate so as to electrically connect said first electrode plate to a battery terminal.

2. A battery as recited in claim 1 wherein the battery is a nickel hydride battery.

3. A battery as recited in claim 1 wherein the battery is a nickel cadmium battery.

4. A battery as recited in claim 1 wherein the battery is a rechargeable lithium ion battery.

5. A battery as recited in claim 1 wherein said electrode assembly is a spiral electrode having said first electrode plate and said second electrode plate layered via said separator and wound into a spiral shape.

6. A battery as recited in claim 1 wherein said substrate of said first electrode plate comprises metal material having three-dimensional porosity.

7. A battery as recited in claim 6 wherein said substrate comprises foamed nickel porous material.

8. A battery as recited in claim 6 wherein said substrate comprises nickel fiber porous material.

9. A battery as recited in claim 1 wherein said connecting band comprises a region whereat loaded active material is removed so as to expose said substrate.

10. A battery as recited in claim 1 wherein said connecting band is free of active material so as to expose the substrate.

11. A battery as recited in claim 1 wherein said substrate comprises metal material having three-dimensional porosity, a metal plate being attached to said connecting band comprised of said three-dimensional porous metal substrate, said metal plate being welded to said collector plate.

12. A battery as recited in claim 11 wherein said metal plate is nickel ribbon.

13. A battery as recited in claim 11 wherein said metal plate is welded to and electrically connected to said connecting band.

14. A battery as recited in claim 11 wherein said metal plate is electrically connected to said connecting band via conductive adhesive.

15. A battery as recited in claim 1 wherein an amount of overlap of said end of said second electrode plate over said active material border is from 0.3 mm to 1.5 mm.

16. A battery as recited in claim 15 wherein said amount of overlap is from 0.5 mm to 1 mm.

17. A battery as recited in claim 1 wherein said substrate comprises metal material having three-dimensional porosity, and said three-dimensional porous metal substrate is pressed at said connecting band such that said substrate of said connecting band has a higher density than said substrate of said active material portion.

18. A battery as recited in claim 5 wherein said electrode assembly is wound with a metal plate welded to an inside surface of said connecting band.

19. A battery as recited in claim 1 wherein said collector plate is perforated with a plurality of holes, and has projections extending downward from a periphery of each of said holes, said projections connecting with said connecting band.

* * * * *